(12) United States Patent
Fukuda et al.

(10) Patent No.: US 8,812,312 B2
(45) Date of Patent: Aug. 19, 2014

(54) SYSTEM, METHOD AND PROGRAM FOR SPEECH PROCESSING

(75) Inventors: Takashi Fukuda, Yokohama (JP);
Osamu Ichikawa, Yokohama (JP);
Masafumi Nishimura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1223 days.

(21) Appl. No.: 12/200,610

(22) Filed: Aug. 28, 2008

(65) Prior Publication Data

US 2009/0210224 A1 Aug. 20, 2009

(30) Foreign Application Priority Data

Aug. 31, 2007 (JP) ................................. 2007-225195

(51) Int. Cl.
*G10L 15/00* (2013.01)
*G10L 15/20* (2006.01)
*G10L 17/00* (2013.01)

(52) U.S. Cl.
USPC ........................... 704/233; 704/231; 704/246

(58) Field of Classification Search
USPC ................................................. 704/233, 246
See application file for complete search history.

(56) References Cited

U.S. PATENT DOCUMENTS

| | | | | |
|---|---|---|---|---|
| 5,721,694 A | * | 2/1998 | Graupe | 702/191 |
| 5,727,124 A | * | 3/1998 | Lee et al. | 704/233 |
| 5,812,973 A | * | 9/1998 | Wang | 704/253 |
| 6,366,880 B1 | * | 4/2002 | Ashley | 704/226 |
| 6,732,073 B1 | * | 5/2004 | Kluender et al. | 704/233 |
| 7,035,797 B2 | * | 4/2006 | Iso-Sipila | 704/227 |
| 7,516,067 B2 | * | 4/2009 | Seltzer et al. | 704/226 |
| 7,672,842 B2 | * | 3/2010 | Ramakrishnan et al. | 704/230 |

(Continued)

FOREIGN PATENT DOCUMENTS

| | | |
|---|---|---|
| JP | 4116700 A | 4/1992 |
| JP | 06-289896 A | 10/1994 |

(Continued)

OTHER PUBLICATIONS

Zhu, "Non-linear feature extraction for robust recognition in stationary and non-stationary noise", 2003, Computer, Speech, and Language, 17(4), pp. 381-402.*

(Continued)

*Primary Examiner* — Richemond Dorvil
*Assistant Examiner* — Olujimi Adesanya
(74) *Attorney, Agent, or Firm* — Scully, Scott, Murphy & Presser, P.C.; Gail Zarick, Esq.

(57) ABSTRACT

The present invention relates to a system, method and program for speech recognition. In an embodiment of the invention a method for processing a speech signal consists of receiving a power spectrum of a speech signal and generating a log power spectrum signal of the power spectrum. The method further consists of performing discrete cosine transformation on the log power spectrum signal and cutting off cepstrum upper and lower terms of the discrete cosine transformed signal. The method further consists of performing inverse discrete cosine transformation on the signal from which the cepstrum upper and lower terms are cut off. The method further consists of converting the inverse discrete cosine transformed signal so as to bring the signal back to a power spectrum domain and filtering the power spectrum of the speech signal by using, as a filter, the signal which is brought back to the power spectrum domain.

9 Claims, 5 Drawing Sheets

(56) References Cited

U.S. PATENT DOCUMENTS

| | | | |
|---|---|---|---|
| 7,809,559 B2* | 10/2010 | Kushner et al. | 704/228 |
| 2003/0009333 A1* | 1/2003 | Sharma et al. | 704/246 |
| 2003/0023430 A1* | 1/2003 | Wang et al. | 704/226 |
| 2004/0128130 A1* | 7/2004 | Rose et al. | 704/236 |
| 2004/0158465 A1* | 8/2004 | Rees | 704/233 |
| 2006/0122832 A1* | 6/2006 | Takiguchi et al. | 704/240 |
| 2006/0182290 A1* | 8/2006 | Yano | 381/101 |
| 2006/0265210 A1* | 11/2006 | Ramakrishnan et al. | 704/205 |
| 2008/0071540 A1* | 3/2008 | Nakano et al. | 704/251 |
| 2009/0063142 A1* | 3/2009 | Sukkar | 704/226 |

FOREIGN PATENT DOCUMENTS

| | | | |
|---|---|---|---|
| JP | 08-275087 A | | 10/1996 |
| JP | 2000-020090 A | | 1/2000 |
| JP | 2001-024976 | | 1/2001 |
| JP | 2001-249676 A | | 9/2001 |
| JP | P2003-76393 | | 3/2003 |
| JP | 2003-108200 A | | 4/2003 |
| JP | 2003337594 | | 11/2003 |
| JP | 2004-012700 A | | 1/2004 |
| JP | 2004-297273 A | | 10/2004 |
| JP | 2005-062442 A | | 3/2005 |
| JP | 2007-025296 A | | 2/2007 |
| JP | 2007-079389 A | | 3/2007 |
| JP | 2008-026777 A | | 2/2008 |
| WO | WO 0229782 A1 * | | 4/2002 |

OTHER PUBLICATIONS

Biing-Hwang Juang et al, "On the use of bandpass liftering in speech recognition," Jul. 1987, Acoustics, Speech and Signal Processing, IEEE Transactions on , vol. 35, No. 7, pp. 947-954.*

Nakamura, M. Fujimoto, and K. Takeda, "CENSREC2: Corpus and Evaluation Environments for in Car Continuous Digit Speech Recognition," Sep. 2006, Proc. ICSLP '06, pp. 2330-2333.*

Gu et al, "Perceptual harmonic cepstral coefficients for speech recognition in noisy environment," 2001, Acoustics, Speech, and Signal Processing, 2001. Proceedings. (ICASSP '01). 2001 IEEE International Conference on , vol. 1, No., pp. 125-128 vol. 1.*

Jung, "Filtering of filter-bank energies for robust speech recognition," 2004, ETRI Journal, 26 (3), pp. 273-276, 2004.*

Takeo Kobayashi, "Cepstal and Mel-Cepstal Analysis of Speech" The Institute of Electronics Information and Communication Engineers, Technical Report of IEICE, vol. 98 No. 263.

Gu et. al., "Perceptual Harmonic Cepstral Coefficients as the Front-end for Speech Recognition," In ICSLP-2000, vol. 1, 309-312, United States of America.

Midorikawa, Y. et al., "Nonliner weighting function on quefrency domain for noisy speech recognition", Reports of the spring 2005 meeting the Acoustical Society of Japan, Mar. 2005.

Ikeda, M. et al., "Speaker Recognition Weighted Cepstrum", Report of the meeting the Acoustical Society of Japan, Mar. 1987.

* cited by examiner

SYSTEM, METHOD AND PROGRAM FOR SPEECH PROCESSING

CROSS-REFERENCE TO RELATED APPLICATIONS

This application claims priority under 35 U.S.C. §119 from Japanese Patent Application No. 2007-225195 filed Aug. 31, 2007, the entire contents of which is incorporated herein by reference.

FIELD OF THE INVENTION

The present invention relates to a speech recognition technique. More particularly, the present invention relates to a system capable of performing speech recognition stably under noisy environment conditions.

BACKGROUND OF THE INVENTION

In recent years, a speech recognition technique has been increasingly demanded particularly in the automotive industry. Specifically, in a vehicle, it has heretofore been required to manually perform operations not directly related to driving, such as operating buttons in a car navigation system and turning on and off an air conditioner. Thus, during such operations, steering is paid little attention to, which could involve a risk of accident.

Meanwhile, there have been appearing vehicles equipped with systems which enable drivers to perform various operations by giving instructions with speech while concentrating on driving. When the driver gives an instruction with speech even while driving, a microphone provided in a map light unit receives the speech. At the same time, the system recognizes the speech and converts the speech into a command to operate the car navigation system. Thus, the car navigation system is operated. Similarly, the air conditioner and an audio system can be operated with speech.

However, since speech recognition in the vehicle is exposed to a lot of noise, it is difficult to achieve a high recognition rate by suppressing the noise. Typical kinds of noise during the running of the vehicle are as follows:
1. Music Reproduction
2. Interfering speech of fellow passengers
3. Noise generated when an air volume of a fan is large and noise generated when windows are open.

As to the music reproduction, sounds can be canceled by using an echo canceller technique. As to the interfering speech of fellow passengers, for example, a microphone for speech recognition can be set not to receive speech of the fellow passengers by using a microphone array technique.

"Perceptual Harmonic Cepstral Coefficients as the Front-end for Speech Recognition," discloses that perceptual harmonic cepstral coefficients (PHCC) are proposed as features to extract for speech recognition. The publication further states, pitch estimation and classification into voiced, unvoiced, and transitional speech are performed by a spectro-temporal auto-correlation technique. A peak picking algorithm is then employed to precisely locate pitch harmonics. A weighting function, which depends on the classification and the pitch harmonics, is applied to the power spectrum and ensures accurate representation of the voiced speech spectral envelope. The harmonics weighted power spectrum undergoes mel-scaled band-pass filtering, and the logenergy of the filters' output is discrete cosine transformed to produce cepstral coefficients. For perceptual considerations, within-filter cubic-root amplitude compression is applied to reduce amplitude variation without compromise of the gain invariance properties. Experiments show substantial recognition gains of PHCC over MFCC, with 48% and 15% error rate reduction for the Mandarin digit database and E-set, respectively.

Japanese Patent Application Publication No. 2001-024976 discloses an image processor, electronic camera, control method for these and memory medium. This publication discusses providing an electronic camera capable of easily utilizing an external device. The disclosure states when an external device such as image pickup device, recording device, display device or communication device is mounted on an electronic camera, a system control circuit judges whether that external device 210 has a function similar to a built-in device or not. When the built-in and external devices have the mutually similar functions, the operation of that external device is validated in place of that internal device.

Japanese Patent Application Publication No. 2003-337594 discloses a voice recognition device, method and program. This publication discloses a method in which background noise other than the sound source located along an objective direction is efficiently eliminated to realize highly precise voice recognition and to provide a system using the method. This publication further discloses an angle distinctive power distribution, that is observed by orienting the directivity of a microphone array toward various sound source directions being considered and is approximated by the sum of coefficient multiples of a reference angle distinctive power distribution that is beforehand measured using reference sound along the objective sound source directions and a reference angle distinctive power distribution of non-directive background sound. The publication further discloses that only the components along the objective sound source direction are extracted. Moreover, when the objective sound source direction is unknown, the objective sound source direction is estimated by selecting the one which minimizes an approximation residue in a sound source location searching section among the reference angle distinctive power distributions along various sound source directions. Furthermore, a maximum likelihood operation is conducted using the voice data of the components along the sound source direction being processed and the voice model which is obtained by making a prescribed model for the voice data and voice recognition is conducted based on the obtained estimated value.

Japanese Patent Application Publication No. 2003-76393 discloses a method for estimating voice in noisy environment and voice recognition method. The disclosure discusses providing a voice estimating method and a voice recognition method which are robustly operated even of a voice signal inputted in noises or a voice signal in which noise is mixed on a communication line. The voice estimating method includes a step for segmenting an input acoustic signal by short-time segments, an acoustic analyzing step for performing a short time frequency analysis, an element estimating step for estimating elements required for voice estimation, and a voice estimating step for estimating a voice by using elements obtained in the element estimating step. Concretely, the input acoustic signal is segmented by short-time segments, and short-time frequency analysis is performed, and spectrum envelopes of voice held in a code book for voice recognition are utilized as knowledge to generate sound models, and spectrum information obtained by the short-time frequency analysis is regarded as a probability density function, and maximum posteriori probability estimation is used to estimate mixed weight values, and it is judged that the existence supposition of elements generating the sound model having the maximum weight value at each time has the maximum likelihood, and these elements are outputted.

Against this background, an object of the present invention is to provide a system capable of performing speech recognition stably under noisy environment conditions. This object can be achieved by using a combination of features described in the independent claims in the scope of claims. In addition, the dependent claims define more advantageous specific examples of the present invention.

SUMMARY OF THE INVENTION

The illustrative embodiments of the present invention described herein provide a system, method and program for speech processing. The embodiments described herein further disclose a system capable of performing speech recognition stably under noisy environment conditions.

An exemplary feature of the present invention is a speech processing system for processing a speech signal using a computer. The system consists of a first means for receiving a power spectrum of a speech signal and generating a log power spectrum of the power spectrum. The system further consists of a second means for performing discrete cosine transformation on an output from the second means. The system further consists of a third means for receiving an output from the second means to cut off cepstrum upper and lower terms of the output. The system further consists of a fourth means for receiving an output from the third means to perform inverse discrete cosine transformation on the output. The system further consists of a fifth means for converting an output from the fourth means so as to bring the output back to a power spectrum domain. The system further consists of a sixth means for filtering the power spectrum of the speech signal by using, as a filter, the output which is brought back to the power spectrum domain.

Another exemplary feature of the present invention is a speech processing method for processing a speech signal using a computer. The method consists of receiving a power spectrum of a speech signal and generating a log power spectrum signal of the power spectrum. The method further consists of performing discrete cosine transformation on the log power spectrum signal. The method further consists of cutting off cepstrum upper and lower terms of the discrete cosine transformed signal. The method further consists of performing inverse discrete cosine transformation on the signal from which the cepstrum upper and lower terms are cut off. The method further consists of converting the inverse discrete cosine transformed signal so as to bring the signal back to a power spectrum domain. The method further consists of filtering the power spectrum of the speech signal by using, as a filter, the signal which is brought back to the power spectrum domain.

Another exemplary feature of the present invention is a computer program product including a computer readable program, wherein the speech processing program when executed on a computer causes the computer to perform the method steps for operating a computer to process a speech signal for speech recognition. The method consists of receiving a power spectrum of a speech signal and generating a log power spectrum signal of the power spectrum. The method further consists of performing discrete cosine transformation on the log power spectrum signal. The method further consists of cutting off cepstrum upper and lower terms of the discrete cosine transformed signal. The method further consists of performing inverse discrete cosine transformation on the signal from which the cepstrum upper and lower terms are cut off. The method further consists of converting the inverse discrete cosine transformed signal so as to bring the signal back to a power spectrum domain. The method further consists of filtering the power spectrum of the speech signal by using, as a filter, the signal which is brought back to the power spectrum domain.

Another exemplary feature of the present invention is a speech recognition system for performing speech recognition using a computer. The system consists of a first means for receiving a power spectrum of a speech signal and generating a log power spectrum of the power spectrum. The system further consists of a second means for performing discrete cosine transformation on an output of the log power spectrum. The system further consists of a third means for receiving an output from the second means to cut off cepstrum upper and lower terms of the output. The system consists of a fourth means for receiving an output from the third means to perform inverse discrete cosine transformation on the output. The system consists of a fifth means for converting an output from the fourth means so as to bring the output back to a power spectrum domain. The system consists of a sixth means for filtering the power spectrum of the speech signal by using, as a filter, the output which is brought back to the power spectrum domain, wherein speech recognition processing is performed by using the filtered power spectrum.

Another exemplary feature of the present invention is a speech output system for outputting a speech captured with a microphone using a computer. The system consists of a first means for performing A/D conversion on the speech captured with the microphone to output a digital speech signal. The system further consists of a second means for performing discrete Fourier transformation on the digital speech signal to output a power spectrum of the speech signal. The system further consists of a third means for receiving the power spectrum of the speech signal to generate a log power spectrum of the power spectrum. The system further consists of a fourth means for performing discrete cosine transformation on an output of the log power spectrum. The system further consists of a fifth means for receiving an output from the fourth means to cut off cepstrum upper and lower terms of the output. The system further consists of a sixth means for receiving an output from the fifth means to perform inverse discrete cosine transformation on the output. The system further consists of a seventh means for converting an output from the sixth means so as to bring the output back to a power spectrum domain. The system further consists of an eighth means for filtering the power spectrum of the speech signal by using, as a filter, the output which is brought back to the power spectrum domain. The system further consists of a ninth means for performing D/A conversion on the filtered power spectrum to output an analog speech signal.

Various other features, exemplary features, and attendant advantages of the present disclosure will become more fully appreciated as the same becomes better understood when considered in conjunction with the accompanying drawings, in which like reference characters designate the same or similar parts throughout the several views.

BRIEF DESCRIPTION OF THE DRAWINGS

The figures form a part of the specification and are used to describe the embodiments of the invention and explain the principle of the invention together with the literal statement. The foregoing and other objects, aspects, and advantages will be better understood from the following non-limiting detailed description of preferred embodiments of the invention with reference to the drawings, wherein.

DETAILED DESCRIPTION OF THE PREFERRED EMBODIMENTS

Figure 1:
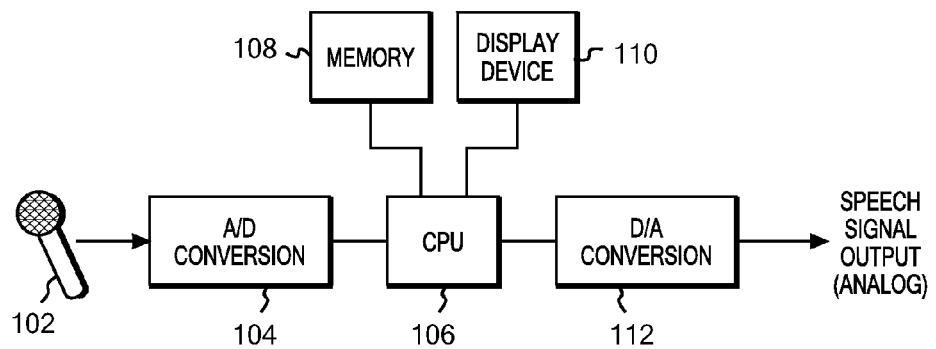
FIG. 1 illustrates a schematic block diagram of a hardware configuration for carrying out the present invention.

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 shows a schematic block diagram of an example of a hardware configuration for carrying out the present invention. In FIG. 1, a sound generated near a microphone 102 is inputted as an analog signal to an analog-to-digital (A/D) converter 104 by the microphone 102. Thereafter, the A/D converter 104 converts the analog signal into a digital signal that can be processed by a CPU 106.

In the case of a car navigation system, for example, the sounds captured by the microphone 102 include not only speeches of a driver and a passenger but also an air blowing sound of an air conditioner, sounds outputted from a car audio system, an engine sound, a sound of a horn, and the like. In the case where a car window is opened, the sounds received by the microphone 102 also include noise from oncoming cars, voices of passers-by, and the like.

The CPU 106 performs, on digitized speech signals thus received, processing required for speech information processing, such as discrete Fourier transformation and discrete cosine transformation, by operating preinstalled software (not shown). Specific processing performed by the CPU 106 will be described in detail later.

The CPU 106 requires a certain size of memory region to perform the speech information processing described above. For example, since matrix calculation is executed for the discrete Fourier transformation and the discrete cosine transformation, a region to store variables of a matrix and intermediate values is required. Thus, it is preferable that a memory 108 that is a random access memory (RAM) is connected to the CPU 106 so as to enable data to be read and written by the CPU 106. A display device 110 is connected to the CPU 106 through a suitable input-output interface (not shown). The display device 110 is used to provide a user with processing contents and status, and other visual information.

In the embodiment shown in FIG. 1, a digital speech signal obtained as a result of processing by the CPU 106 is converted into an analog signal by a digital-to-analog (D/A) converter 112. This analog signal is sent to a speech recognition device and processed. Moreover, in this case, since the signal is analog, the user can also listen to the signal as it is through a speaker (not shown). Thus, the above configuration can also be used for a hearing aid.

Figure 2:
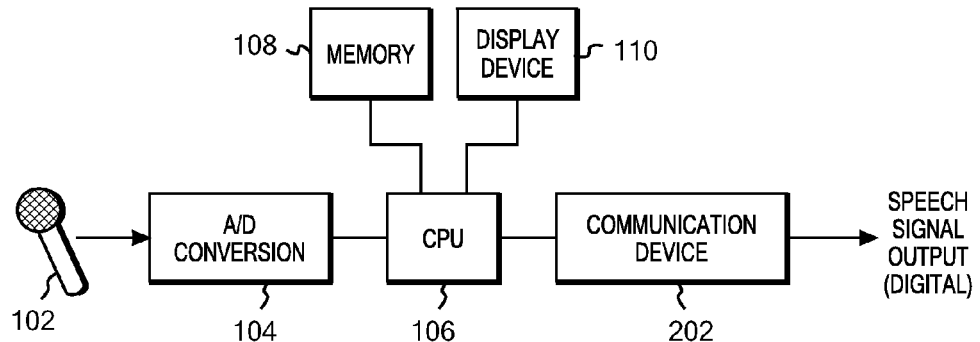
FIG. 2 illustrates a schematic block diagram of another hardware configuration for carrying out the present invention.

An embodiment shown in FIG. 2 has the same configuration as that shown in FIG. 1, except that the D/A converter 112 in FIG. 1 is replaced by a communication device 202. In the embodiment shown in FIG. 2, a digital speech signal obtained as a result of processing by a CPU 106 is sent to a speech recognition device using a digital communication method such as PCI and Ethernet (trademark), and processed.

Figure 3:
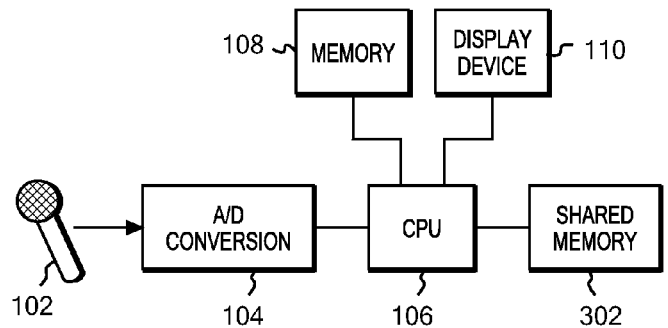
FIG. 3 illustrates a schematic block diagram of a still another hardware configuration for carrying out the present invention.

An embodiment shown in FIG. 3 has the same configuration as that shown in FIG. 1, except that the D/A converter 112 in FIG. 1 is replaced by a shared memory 302. The shared memory 302 may be a part of a memory 108 or may be a separate memory. In the embodiment shown in FIG. 3, a digital speech signal obtained as a result of processing by a CPU 106 is stored in the shared memory 302 and data of the speech signal is read from the shared memory by a speech recognition device at suitable timing.

Figure 4:
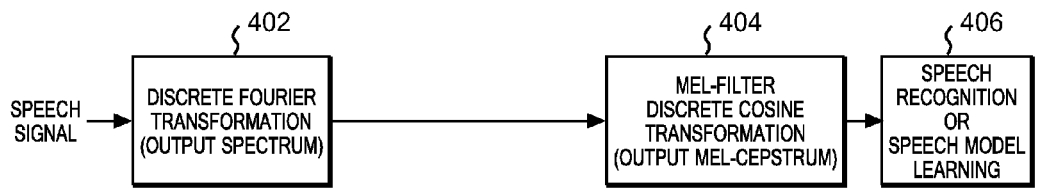
FIG. 4 illustrates a processing block diagram of a conventional typical speech recognition system.

FIG. 4 shows preprocessing for typical speech recognition which has heretofore been known. A speech signal that enters from the left side of FIG. 4 is assumed to be previously converted into a digital signal by the A/D converter 104 shown in each of FIGS. 1 to 3.

In a block 402, frame processing is first performed on the digital speech signal using an appropriate method, such as a hanning windowing and a hamming windowing, and then discrete Fourier transformation is performed thereon. Next, in a block 404, mel-filter discrete cosine transformation is performed on a spectrum of the speech signal to obtain a mel-cepstrum that is a cepstrum on a log scale. Here, the reason why the log scale is used is that human hearing characteristics is empirically shown to be based on the log scale. Thereafter, in a block 406, the mel-cepstrum thus obtained is used to perform speech recognition by using a known method such as hidden Markov model (HMM), an acoustic model and an N-gram language model. However, since speech recognition processing itself is not the subject matter of the present invention, further description thereof will be omitted.

Figure 5:
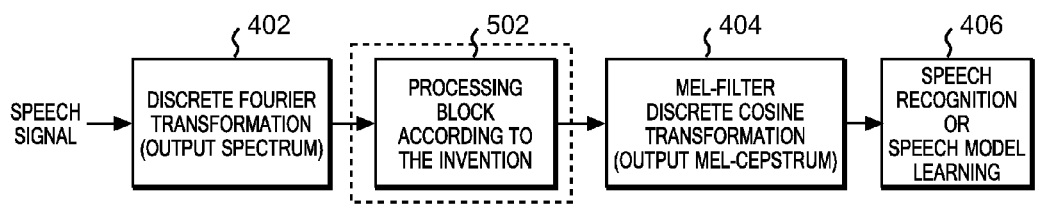
FIG. 5 illustrates a processing block diagram when the present invention is applied to the conventional typical speech recognition system.

FIG. 5 shows positioning of a technique of the present invention. Specifically, as shown in FIG. 5, a processing block 502 of the present invention can be inserted between the block 402 for outputting the spectrum of the speech signal and the block 404 for outputting the mel-cepstrum in the conventional technique, while maintaining consistency of the entire processing. In other words, the processing block 502 of the present invention can be inserted between the blocks in the conventional technique without modifying functions of the blocks of the conventional technique. This is one of the advantageous features of the processing technique of the present invention. The functions of the processing block 502 are summarized as follows. Specifically, a filter is prepared directly from an observed speech itself and an output filtered with the filter is sent to the block 404. This filter preparation processing is performed independently for each speech frame. In other words, a new filter is designed each for the respective speech frame. Incidentally the acoustic model used by a speech recognition part in the block 406 is trained by using a speech Also in that training, it is preferable to use the block 502 of the present invention.

Figure 6:
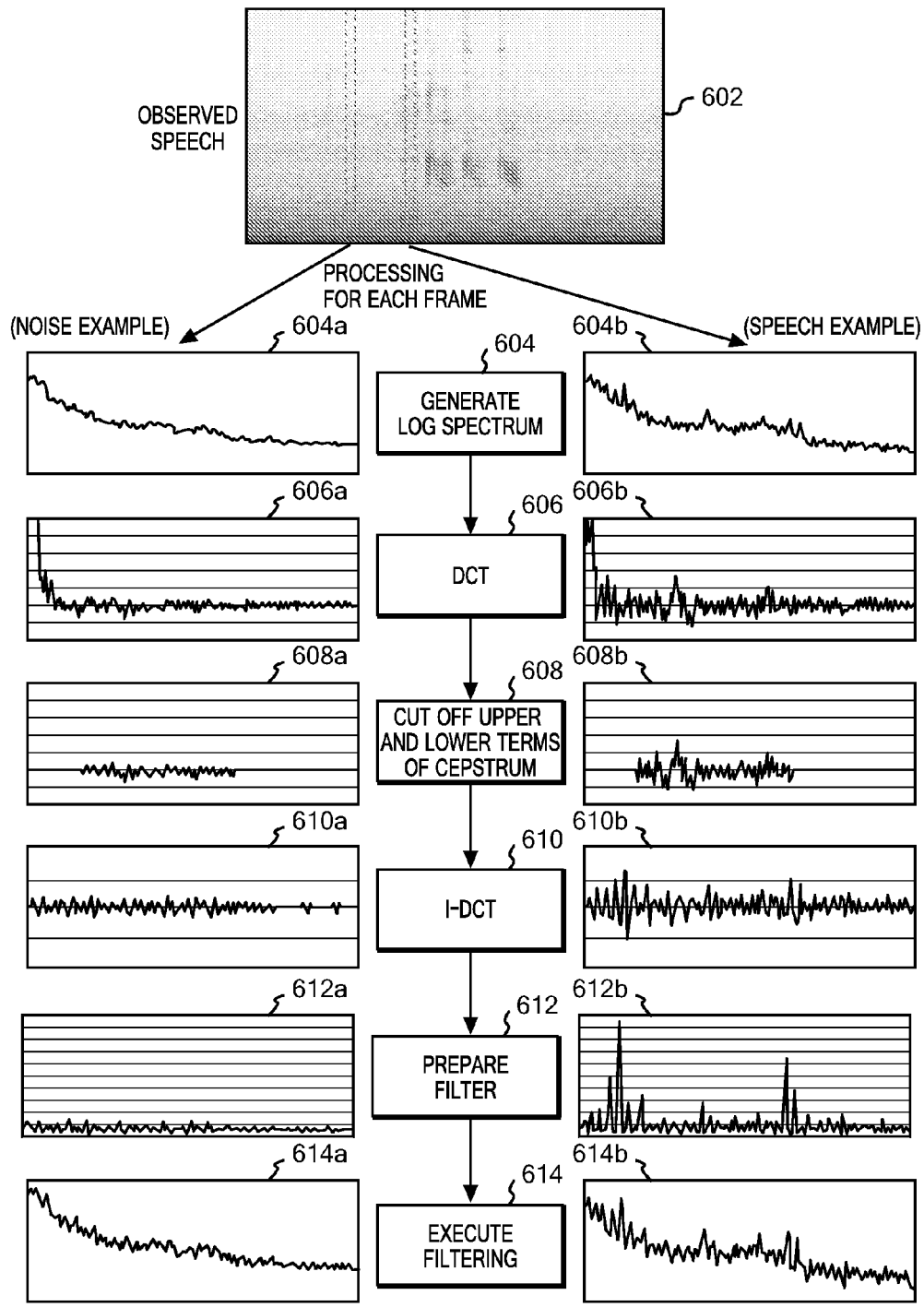
FIG. 6 illustrates a speech processing flowchart according to the present invention and corresponding spectra.

With reference to FIG. 6, speech processing according to an embodiment of the present invention will be described. FIG. 6 shows an example of a spectrum 602 of an observed speech. Assuming that j is a bin number of discrete Fourier transformation, and that $y_T(j)$ is a power spectrum of a T-th frame of the observed speech, a log power spectrum $Y_T(j)$ is calculated by the following equation in Step 604:

$$Y_T(j) = \log(y_T(j))$$

Moreover, in calculation of the log power spectrum of a T-th frame, an average of power spectra of several frames before and after the T-th frame may be used to obtain a more stable expression. Thus, the term "log power spectrum" in the present specification also includes a log power spectrum of the average of the power spectra of several frames before and after the target frame.

Note that the bin number corresponds to a frequency of the discrete Fourier transformation. For example, when 512 points of discrete Fourier transformation is performed at a sampling frequency of 16 KHz, the following result is obtained:

| bin number | Frequency |
|---|---|
| 0 | 0 Hz |
| 1 | 31.25 Hz |
| 2 | 62.5 Hz |
| 3 | 93.75 Hz |
| . | . |
| . | . |
| . | . |
| 256 | 8000 Hz |

Specifically, outputs of the discrete Fourier transformation are put together for each stepwise frequency and referred to by the number.

A log power spectrum 604a is obtained by performing the above-described processing on a noise example. A log power spectrum 604b is obtained by performing the above-described processing on a speech example. As shown in FIG. 6, the noise example and the speech example are taken from different frames.

Next, assuming that a discrete cosine transformation matrix is D(i, j), a cepstrum $C_T(i)$ is obtained as follows in Step 606:

$$C_T(i) = \sum_j D(i, j) Y_T(j)$$ [Formula 1]

Note that the discrete cosine transformation matrix has the following components:

$$D(i, j) = \sqrt{\frac{2}{n}} K_i \cos\left(\frac{(i-1)\left(j-\frac{1}{2}\right)}{n}\pi\right)$$ [Formula 2]

$$\begin{cases} K_i = \frac{1}{\sqrt{2}}, & i = 0 \\ K_i = 1, & i \neq 0 \end{cases}$$

A cepstrum 606a is obtained by performing the above-described processing on the noise example. A cepstrum 606b is obtained by performing the above-described processing on the speech example.

The cepstra represent the curvatures of the log power spectra. The lower cepstra correspond to long oscillations, and the upper cepstra correspond to short oscillations. We need only the medium oscillations so to cover possible harmonic structures in the human voice. Thus, in Step 608, the lower and the upper cepstra should be filtered out. Specifically, processing expressed by the following formula is performed:

$$\begin{cases} \hat{C}_T(i) = \varepsilon C_T(i), & i < \text{lower\_cep\_num} \\ \hat{C}_T(i) = \varepsilon C_T(i), & i > \text{upper\_cep\_num} \\ \hat{C}_T(i) =, & i \geq \text{lower\_cep\_num and } i \geq \text{upper\_cep\_num} \end{cases}$$ [Formula 3]

A compensated cepstrum 608a is obtained by performing the above-described processing on the noise example. A compensated cepstrum 608b is obtained by performing the above-described processing on the speech example. In the above formula, $\varepsilon$ is 0 or a very small constant. Moreover, lower_cep_num and upper_cep_num correspond to a possible range as the harmonic structure of the human speech. In one experimental example, assuming that a fundamental frequency of the human speech is between 100 MHz and 400 MHz, lower_cep_num is set to 40 and upper_cep_num is set to 160. Note, however, that this is a setting example in the case where the sampling frequency is 16 KHz and a fast Fourier transformation (FFT) length is 512 points.

Next, in Step 610, inverse discrete cosine transformation is performed on the cepstrum processed in Step 608, thereby bringing the processed cepstrum back to a log power spectrum domain. Specifically, processing expressed by the following formula is performed:

$$W_T(j) = \sum_i D^{-1}(j, i) \hat{C}_T(i)$$ [Formula 4]

Here, $D^{-1}(j, i)$ represents i and j components of an inverse discrete cosine transformation matrix $D^{-1}$. $D^{-1}$ denotes an inverse matrix of the discrete cosine transformation matrix D described above. Generally, since D is a unitary matrix, $D^{-1}$ is obtained as a transposed matrix of D.

A compensated log power spectrum 610a is obtained by performing the above-described processing on the noise example. A compensated log power spectrum 610b is obtained by performing the above-described processing on the speech example.

In Step 612, first, performed is processing of bringing the result obtained by performing the inverse discrete cosine transformation back to a power spectrum domain from the log power spectrum domain using the following formula. Specifically, the processing expressed by the following formula is performed:

$$w_T(j) = \exp(W_T(j))$$ [Formula 5]

Next, normalization is performed on the result of Step 612 by using the following formula so that its average value can be 1, thereby finally preparing a filter. In the following formula, Num_bin denotes the total number of bin. A filter 612a shows such a filter obtained from the noise example. A filter 612b shows such a filter obtained from the speech example. As shown in the filters 612a and 612b, the filter of the noise example has low and gentle peaks and the filter of the speech example has high and sharp peaks in general:

$$w_T(j) = w_T(j) \frac{\text{Num\_bin}}{\sum_k w_T(k)}$$ [Formula 6]

In Step 614, as expressed by the following formula, the power spectrum of the frame T is multiplied by the signal thus obtained as a weighting factor for each bin. Thus, the power spectrum is filtered to enhance the observed speech:

$$z_T(j) = y_T(j)\overline{w}_T(j) \quad \text{[Formula 7]}$$

$z_T(j)$ thus obtained is a power spectrum of an output speech in the T-th frame of the bin number j. A spectrum 614a is obtained from the noise example and a spectrum 614b is obtained from the speech example. Here, comparison of the spectrum 604a and the spectrum 614a shows that the spectrum of the noise example remains substantially unchanged by the processing shown in FIG. 6. On the other hand, in the case of the speech example, spectrum 614b obtained as a result of the processing shown in FIG. 6 has higher formants than the spectrum 604b. This shows that speech recognition can be performed with high accuracy even under noisy environment.

Meanwhile, application of the present invention adds another discrete cosine transformation and another inverse discrete cosine transformation to the case of no application of the present invention. In other words, a calculation of multiplying a 256-dimensional vector by a 256×256 matrix is performed twice when the FFT length is 512 points. Although this calculation amount is not so considerable as that required for speech recognition itself, the calculation amount increased by the application of the present invention can be reduced by reducing executions of the respective transformations from twice to once.

Y . . . vector of log power spectrum of observed speech 256 dimensions

D . . . discrete cosine transformation matrix 256×256 dimensions

A . . . matrix for cutting off upper and lower terms 256×256 dimensions

W . . . log power spectrum after inverse discrete cosine transformation 256 dimensions In this matrix, $\epsilon$ is the same small number as that described in Step 608 of FIG. 6. Note that A is a matrix having the following format:

$$\begin{cases} A_{ij} = 0, & i \neq j \\ A_{ij} = 1, & i = j \text{ and } i \geq \text{lower\_cep\_num and } i \leq \text{upper\_cep\_num} \\ A_{ij} = \varepsilon, & i = j \text{ and } i < \text{lower\_cep\_num} \\ A_{ij} = \varepsilon, & i = j \text{ and } i > \text{upper\_cep\_num} \end{cases} \quad \text{[Formula 8]}$$

According to the above description, $W = D^{-1}ADY$. Here, since both of D and A are matrices of fixed values, $D^{-1}AD$ can be calculated to obtain one matrix, in advance. Thereby the calculation amount can be reduced, in other words, calculation time can be shortened.

Figure 7:
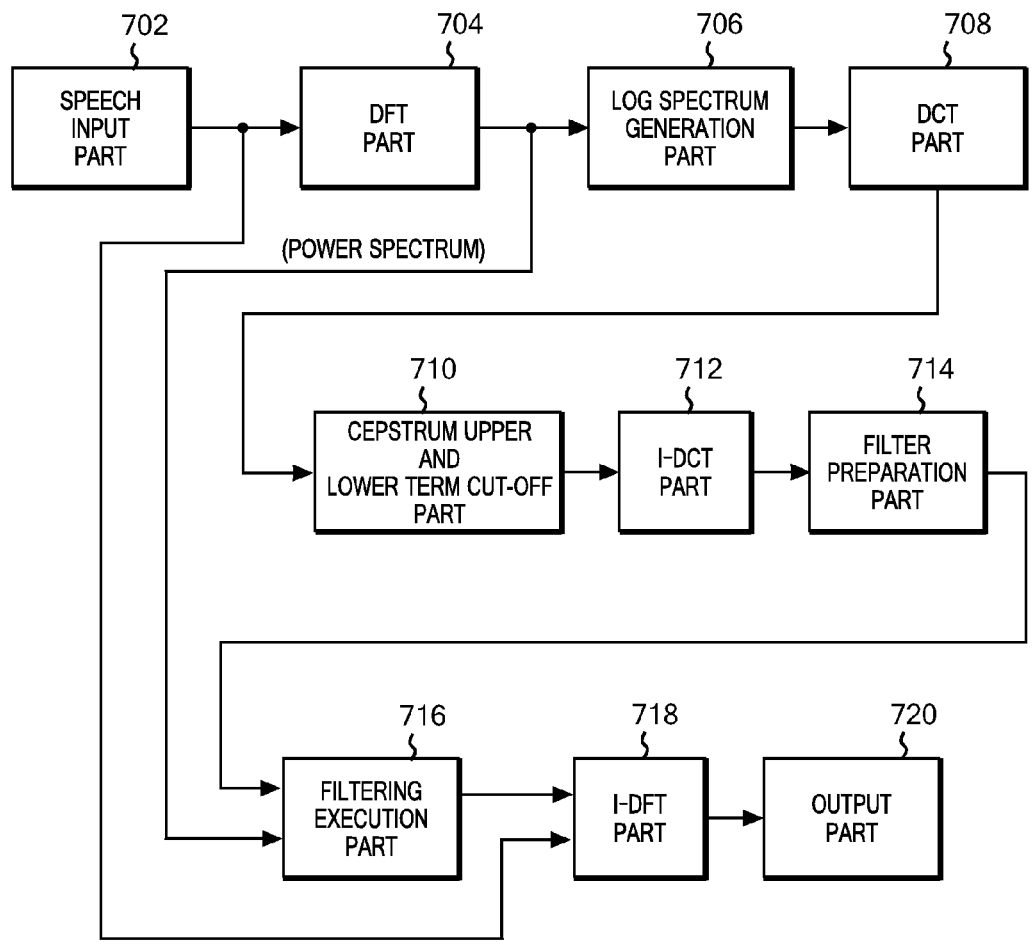
FIG. 7 illustrates a functional block diagram in the case where a speech-enhanced output is provided as a time-domain speech signal to a speech recognition device.

FIG. 7 shows a functional block diagram in the case where a speech-enhanced output is provided as a time-domain speech signal to a speech recognition device. For example, individual functional blocks shown in FIG. 7 can also be regarded as individual software processing modules in a speech processing system according to the present invention.

In FIG. 7, a speech input part 702 provides a digital speech signal using the function of the A/D converter 104 shown in FIG. 1. A discrete Fourier transformation (DFT) part 704 outputs a power spectrum using a discrete Fourier transformation function. A log power spectrum generation part 706 receives the power spectrum from the DFT part 704 and executes the function described as the processing step 604 in FIG. 6. A DCT part 708 receives an output from the log power spectrum generation part 706 and executes the function described as the processing step 606 in FIG. 6. A cepstrum upper and lower term cut-off part 710 receives an output from the DCT part 708 and executes the function described as the processing step 608 in FIG. 6. An I-DCT part 712 receives an output from the cepstrum upper and lower term cut-off part 710 and executes the function described as the processing step 610 in FIG. 6. A filter preparation part 714 receives an output from the I-DCT part 712 and executes the function described as the processing step 612 in FIG. 6. A filtering execution part 716 receives the power spectrum from the DFT part 704 and an output from the filter preparation part 714 and executes the function described as the processing step 614 in FIG. 6. An output from the filtering execution part 716 and an output from the speech input part 702 are inputted to an inverse discrete Fourier transformation (I-DFT) part 718 and converted into a time-domain digital speech signal. This time-domain digital speech signal is outputted as a speech signal that is audible to humans, by an output part having a D/A converter and a speaker, for example.

Figure 8:
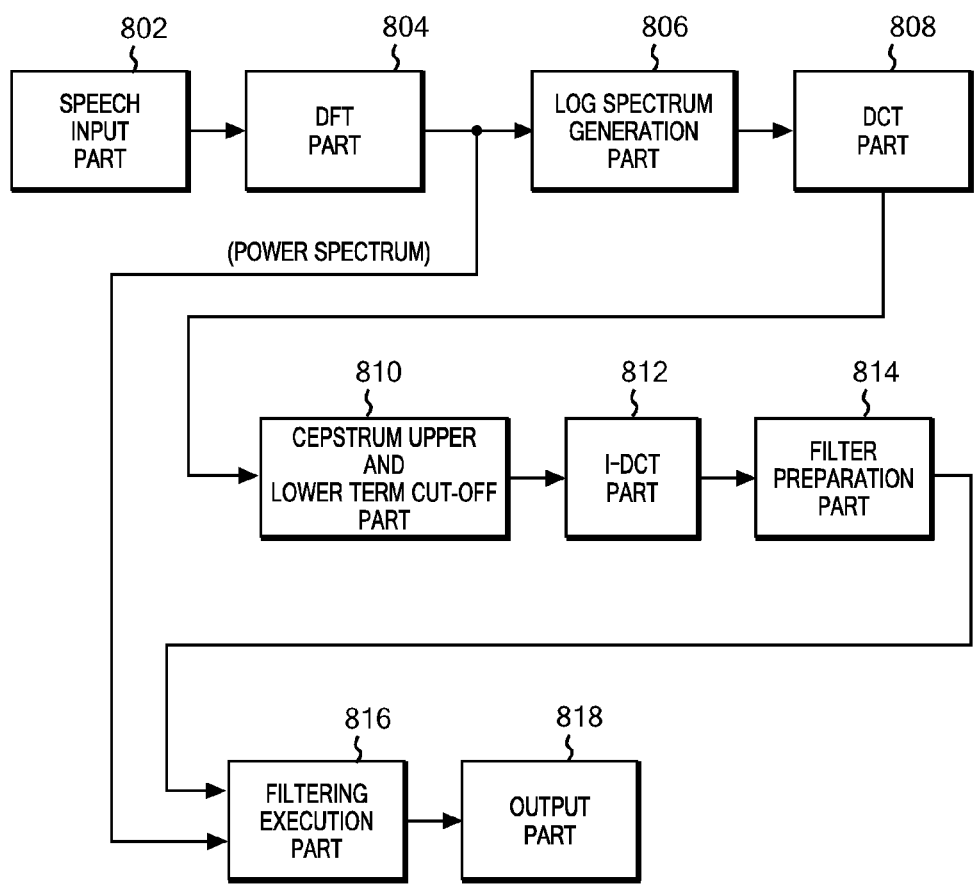
FIG. 8 illustrates a functional block diagram in the case where a speech-enhanced output is provided as a spectral-domain speech signal to the speech recognition device.

FIG. 8 shows a functional block diagram in the case where a speech-enhanced output is provided as a spectral-domain speech signal to a speech recognition device. Similarly, here, individual functional blocks shown in FIG. 8 can also be regarded as individual software processing modules in a speech processing system according to the present invention.

In FIG. 8, a speech input part 802 provides a digital speech signal using the function of the A/D converter 104 shown in FIG. 1. A DFT part 804 outputs a power spectrum using a discrete Fourier transformation function. A log power spectrum generation part 806 receives the power spectrum from the DFT part 804 and executes the function described as the processing step 604 in FIG. 6. A DCT part 808 receives an output from the log power spectrum generation part 806 and executes the function described as the processing step 606 in FIG. 6. A cepstrum upper term and lower term cut-off part 810 receives an output from the DCT part 808 and executes the function described as the processing step 608 in FIG. 6. An I-DCT part 812 receives an output from the cepstrum upper term and lower term cut-off part 810 and executes the function described as the processing step 610 in FIG. 6. A filter preparation part 814 receives an output from the I-DCT part 812 and executes the function described as the processing step 612 in FIG. 6. A filtering execution part 816 receives the power spectrum from the DFT part 804 and an output from the filter preparation part 814 and executes the function described as the processing step 614 in FIG. 6. An output from the filtering execution part 816 is provided as a spectral-domain speech signal to the speech recognition device. An output part 818 may be either the communication device 202 shown in FIG. 2 or the shared memory 302 shown in FIG. 3.

Next, description will be given of an evaluation experiment on speech processing according to the present invention. For the evaluation experiment, in-vehicle speech recognition evaluation database CENSREC-3 (Corpus and Environments for Noisy Speech RECognition) is used, which is created by Information Processing Society of Japan (IPSJ) SIG-SLP Noisy Speech Recognition Evaluation Working Group.

CENSREC-3 includes spoken words uttered inside a vehicle under various environmental conditions such as normal running, hazard indicator ON, air conditioner ON (Low), air conditioner ON (High), audio system ON and opened window. Speech data are classified into two categories: one for training and the other for evaluation. An acoustic model is prepared by using the data for training and the acoustic model is used to execute speech recognition on the data for evaluation. Finally, recognition rates are evaluated. Here, normal speech recognition execution without changing a speech recognition front end or a result thereof is called a base line.

Accordingly, evaluation is made on how much the recognition rates are improved from the base line by changing the speech recognition front end as in the case of the present invention.

CENSREC-3 includes evaluation conditions 1 to 6 determined by which to select as the data for training and evaluation. The evaluation experiment is carried out this time under the condition 3 close to a practical scenario, in which speech data collected by a remote microphone are used for both training and evaluation.

The following table shows results of word recognition rates (accuracy %). In this evaluation experiment, since a drawback is expected with present invention when the background noise contains music or speech from audio devices, the results are divided into those in the case of audio system ON and those in all the other cases. Moreover, the results in the cases of opened window and air conditioner ON (High), in which improvement can be expected, are also individually shown in the table.

TABLE 1

| word recognition rate (%) | audio system OFF | audio system ON | opened window | air conditioner ON (High) |
|---|---|---|---|---|
| base line | 78.8 | 79.9 | 59.5 | 58.1 |
| Present invention | 82.4 | 61.5 | 69.1 | 64.3 |
| SS | 81.8 | 79.5 | 67.6 | 62.1 |
| SS + present invention | 84.6 | 64.6 | 72.6 | 70.5 |

In the speech recognition subjected to the processing of the present invention, the recognition rates are improved from the base line in all the cases but the case of audio system ON. Particularly, significant improvement is achieved in the cases of opened window and air conditioner ON (High), which are target environmental conditions of the present invention. On the other hand, in the case of audio system ON, the recognition rate is deteriorated compared with the base line. Note, however, sounds from the audio system can be effectively reduced by using a well-known echo canceling technique. Thus, it should be understood that the degradation caused by the audio system can be relatively easily reduced.

The technique of the present invention can be used simultaneously with a heretofore known noise reduction technique such as spectral subtraction (SS). As is clear from the results of "SS+present invention" in the table, a combination of SS and the technique of the present invention achieves significant improvement in the recognition rate, compared with the case of using only SS or the case of using only the technique of the present invention, in all the cases except the case of audio system ON.

According to the present invention, a filter is designed directly from an observed speech itself. Thus, this designing method of filters makes it possible to obtain a filter that gives weight to a harmonic structure portion in a speech sound segment and a filter that is approximately flat in a non-speech sound segment having no harmonic structure. Since these differences of filers are continuous, processing can be stably performed without making any distinction between the speech sound segment and the non-speech sound segment.

In the foregoing embodiments of the present invention, the present invention has been described above mainly as the preprocessing system of the speech recognition system. However, the present invention is not limited to such application but can be suitably applied to other uses, such as a hearing aid, by utilizing its noise reduction characteristics and employing the configuration as shown in FIG. 1.

While the present invention has been described with reference to what are presently considered to be the preferred embodiments, it is to be understood that the invention is not limited to the disclosed embodiments. The present invention is intended to cover various modifications and equivalent arrangements included within the spirit and scope of the appended claims. The scope of the following claims is to be accorded the broadcast interpretation so as to encompass all such modifications and equivalent structures and functions.

What is claimed is:

1. A speech output system for outputting a speech captured with a microphone using a computer, the system comprising:
    a first means for performing analog-to-digital conversion on the speech captured with the microphone to output a digital speech signal;
    a second means for performing discrete Fourier transformation on the digital speech signal from the first means to output a power spectrum of the speech signal;
    a third means for receiving the power spectrum of the speech signal from the second means to generate a log power spectrum of the power spectrum;
    a fourth means for performing discrete cosine transformation on the log power spectrum from the third means;
    a fifth means for receiving an output from the fourth means to cut off cepstrum upper and lower terms of the output from the fourth means;
    a sixth means for receiving an output from the fifth means to perform inverse discrete cosine transformation on the output from the fifth means;
    a seventh means for converting an output from the sixth means so as to bring the output from the sixth means back to a power spectrum domain;
    an eighth means for filtering the power spectrum of the speech signal by using, as a filter, the output which is brought back to the power spectrum domain;
    a ninth means for receiving an output from the eighth means, after the filtering, and combining the output with the digital speech signal from the first means to perform an inverse discrete Fourier transformation to output a time domain speech signal; and
    a tenth means for performing digital-to-analog conversion on the output of the ninth means to output an analog speech signal;
    wherein the filtering is performed by multiplying the power spectrum of the speech signal by the output which is brought back to the power spectrum domain.

2. The speech output system according to claim 1, wherein the seventh means further includes means for normalizing the output from the sixth means.

3. The speech output system according to claim 1, wherein the fifth means performs cutting off to obtain terms in a domain corresponding to a harmonic structure in a possible range as a human speech.

4. A speech output method for outputting a speech captured with a microphone using a computer, the method comprising:
    performing analog-to-digital conversion on the speech captured with the microphone to output a digital speech signal;
    performing discrete Fourier transformation on the digital speech signal to output a power spectrum of the speech signal;
    receiving the power spectrum of the speech signal to generate a log power spectrum of the power spectrum;

performing discrete cosine transformation on the log power spectrum to output a discrete cosine transformed signal;

receiving the discrete cosine transformed signal to cut off cepstrum upper and lower terms of the discrete cosine transformed signal to output a cut off discrete cosine transformed signal;

receiving the cut off discrete cosine transformed signal to perform inverse discrete cosine transformation on the cut off discrete cosine transformed signal to output an inverse discrete cosine transformed signal;

converting the inverse discrete cosine transformed signal so as to bring the inverse discrete cosine transformed signal back to a power spectrum domain;

filtering the power spectrum of the speech signal by using, as a filter, the inverse discrete cosine transformed signal which is brought back to the power spectrum domain;

receiving an output from the filtering and combining the output with the digital speech signal to perform an inverse discrete Fourier transformation to output a time domain speech signal; and performing digital-to-analog conversion on the time domain speech signal to output an analog speech signal;

wherein the filtering is performed by multiplying the power spectrum of the speech signal by the inverse discrete cosine transformed signal which is brought back to the power spectrum domain.

5. The speech output method according to claim 4, wherein the converting the inverse discrete cosine transformed signal so as to bring the inverse discrete cosine transformed signal back to a power spectrum domain comprises normalizing the inverse discrete cosine transformed signal.

6. The speech output method according to claim 4, wherein the cutting off obtains terms in a domain corresponding to a harmonic structure in a possible range as a human speech.

7. A computer program product comprising a non-transitory computer useable medium including a computer readable speech processing program, wherein the speech processing program when executed on a computer causes the computer to perform a method for outputting a speech captured with a microphone, the method comprising the steps of:

performing analog-to-digital conversion on the speech captured with the microphone to output a digital speech signal;

performing discrete Fourier transformation on the digital speech signal to output a power spectrum of the speech signal;

receiving the power spectrum of the speech signal to generate a log power spectrum of the power spectrum;

performing discrete cosine transformation on the log power spectrum to output a discrete cosine transformed signal;

receiving the discrete cosine transformed signal to cut off cepstrum upper and lower terms of the discrete cosine transformed signal to output a cut off discrete cosine transformed signal;

receiving the cut off discrete cosine transformed signal to perform inverse discrete cosine transformation on the cut off discrete cosine transformed signal to output an inverse discrete cosine transformed signal;

converting the inverse discrete cosine transformed signal so as to bring the inverse discrete cosine transformed signal back to a power spectrum domain;

filtering the power spectrum of the speech signal by using, as a filter, the inverse discrete cosine transformed signal which is brought back to the power spectrum domain;

receiving an output from the filtering and combining the output with the digital speech signal to perform an inverse discrete Fourier transformation to output a time domain speech signal; and performing digital-to-analog conversion on the time domain speech signal to output an analog speech signal;

wherein the filtering is performed by multiplying the power spectrum of the speech signal by the inverse discrete cosine transformed signal which is brought back to the power spectrum domain.

8. The computer program product according to claim 7, wherein the converting the inverse discrete cosine transformed signal so as to bring the inverse discrete cosine transformed signal back to a power spectrum domain comprises normalizing the inverse discrete cosine transformed signal.

9. The computer program product according to claim 7, wherein the cutting off obtains terms in a domain corresponding to a harmonic structure in a possible range as a human speech.

* * * * *